United States Patent Office 2,865,898
Patented Dec. 23, 1958

2,865,898

PREPARATION OF SALTS OF DICARBOXYLIC ACID ESTERS

Gordon D. Hiatt and John Emerson, Rochester, N. Y., assignors to Eastman Kodak Company, Rochester, N. Y., a corporation of New Jersey No Drawing. Application August 24, 1955
Serial No. 530,404

10 Claims. (Cl. 260—78.4)

This invention relates to an improved method of preparing the water soluble salts of dicarboxylic acid compounds.

Derivatives of the dicarboxylic acid esters of polyhydroxyl compounds are generally water soluble when in the form of their alkali metal, amine or ammonium salts. For instance, cellulose acetate phthalate, polyvinyl phthalate, cellulose acetate maleate, cellulose phthalate, cellulose acetate succinate, etc. exhibit water solubility when the alkali metal salts of these compounds are prepared in or immersed in water. It has been customary to prepare these salts by adding to a water suspension of the carboxy-containing derivative a salt-forming agent until it has been neutralized and thereupon dissolved. In order to recover the salt from its aqueous solution which results, it has been ordinarily necessary to add to the mass a nonsolvent for the salt, generally acetone or methanol.

One object of our invention is to provide a method of preparing water soluble salts of dicarboxylic acid derivatives without steps for its precipitation and recovery being necessary. Another object of our invention is to provide a method of preparing salts of polymers characterized by the use of nonsolvents. Other objects of our invention will appear herein.

We have found that the water soluble salts of dicarboxylic acid esters of polyhydroxyl compounds may be prepared directly by suspending those esters in a nonsolvent and adding a salt-forming agent thereto. By this procedure, the entire operation may be carried out in suspension and the water soluble salt prepared thereby may be recovered from the mass merely by a filtering step. The salt-forming agent may be added to the suspension of the dicarboxylic acid ester either in the form of a solid such as a powder or flake; in the form of its slurry in water or an organic liquid; or in the form of its solution in water. The suspending agents which have been found to be quite useful in procedures in accordance with our invention are the lower aliphatic monohydroxy alcohols of 2-4 carbon atoms. The presence of water in the mass is desirable but the water content is kept at a low level. The maximum amount of water which may be employed is that which will promote the reaction of the salt-forming agent with the dicarboxylic acid ester without having a softening or gumming effect on the ester. At least 3% of water should be employed. In some cases the amount of water which is useful may be as much as up to 22%, while in other cases the use of not over 10% of water is preferable. With smaller proportions of water, longer times are ordinarily required for preparing the dicarboxylic acid ester salts than where the amount of water employed is near the maximum which may be used to promote the reaction without exerting a softening effect on the product.

Various salt-forming agents are useful in making salts in accordance with our invention. The salt-forming agent may be sodium or potassium hydroxide or it may be the alkali metal salt of a weak acid such as sodium carbonate or sodium acid carbonate. Ordinarily, the alkali metal hydroxides will form the salts in less time than the alkali metal salts of weak acids when used as the salt-forming agent. Ammonium hydroxide and the aliphatic amines are also useful for forming water soluble salts.

Of the nonsolvents which may be employed, we have found that isopropanol is a convenient liquid to employ in the preparation of salts as described. The amount of water which is most effective and which exerts no softening action, varies somewhat depending on the particular material employed as the nonsolvent. Ethanol proved to be a good liquid for use in the process, if the amount of water is restricted to avoid any lumping of the material treated. The alcohols in the higher part of the range appear to be more tolerant of the presence of water, and in several cases where stirring was employed, amounts of water up to 25 or even 30% were found to be operative. It is preferred that the amount of water ordinarily be restricted to not more than 22%.

In procedures in accordance with our invention, we have found that salts may be prepared at various temperatures. A desirable temperature range is 25-35° C. In the case of somewhat higher temperatures such as 50-80° C., the softening effect of the water may become pronounced, and hence lower percentages of water may be necessary. In preparing salts in accordance with our invention, the maximum quantity of water which may be tolerated may be conveniently determined and the reaction may be carried out at a point not more aqueous than that determined. Ordinarily, the salt is less soluble in the suspending solution than the acid material employed at the start.

The following examples illustrate the use of our invention in preparing salts of dicarboxylic acid compounds.

*Example 1*

Seven pounds of cellulose acetate phthalate having an acetyl content of 18% and a phthalyl content of 36% were ground and sifted to obtain a product of not over 60 mesh. The fine material thus obtained was suspended in 21 pounds of isopropanol and 3.5 pounds of water, which mass was treated with 1½ pounds of sodium bicarbonate. Samples were filtered, dried, and tested for water solubility. Samples which were withdrawn after the mass had stood for six hours were not completely water soluble. However, samples taken after longer times showed water solubility, for instance, at the end of 18 hours and of 24 hours standing. A sample that was taken after the mass had stood for 24 hours was completely soluble in water. In 5% concentration, the resulting mass had a pH of 5.3.

*Example 2*

20 parts of a finely divided cellulose acetate phthalate having free carboxyl groups was dispersed in 94 parts of isopropanol and 3 parts of water and 3.7 parts of diethylamine was added to the dispersion. The mass was mixed for one hour whereupon the material was filtered off and dried at room temperature. A diethylamine salt of cellulose acetate phthalate was obtained which was found to be completely soluble in water.

*Example 3*

50 parts of a finely divided cellulose acetate phthalate was suspended in 150 parts of isopropanol and there was added thereto 16 parts of 28% ammonia in 24 parts of water. The suspended material which was an ammonium salt of cellulose acetate phthalate was separated from the mass and was found to be water soluble. Drying of this material at an elevated temperature removed ammonia therefrom and the product became water insoluble.

Example 4

50 parts of cellulose acetate phthalate was dispersed in 150 parts of isopropanol and 20 parts of distilled water. NaOH was added to this suspension. The resulting product was separated from the mass and upon adding to water was found to be completely soluble therein.

Example 5

Polyvinyl phthalate containing 68% combined phthalyl was employed as the starting material. This material was tested for solubility in various mixtures of isopropanol-distilled water, and it was found that when as much as 15% water was used, softening occurred. 10 parts of the polyvinyl phthalate in a finely divided condition was dispersed in a mixture of 90 parts of isopropanol and 10 parts of water. 4.5 parts of sodium bicarbonate was stirred into this mixture. The mixture was tumbled for 24 hours and the solid sodium polyvinyl phthalate which had formed was filtered off, washed with fresh isopropanol and dried. The resulting product was readily soluble in water.

We claim:

1. A method of preparing the salt of an ester selected from the group consisting of the cellulose and polyvinyl phthalates, succinates and maleates, both simple and mixed esters, which comprises dispersing the acid form of the ester in an aliphatic monohydroxy alcohol of 2–4 carbon atoms containing an amount of water, within the range of 3–22%, insufficient to exert a softening effect on the ester, adding thereto an alkaline compound selected from the group consisting of alkali metal, ammonium and aliphatic amine bases in an amount only sufficient to react with the carboxyl groups of the ester and separating the solid product thus obtained from the liquid portion of the mass.

2. A method of preparing the salt of a cellulose acetate phthalate which comprises dispersing the acid form of the cellulose acetate phthalate in an aliphatic monohydroxy alcohol of 2–4 carbon atoms containing an amount of water, within the range of 3–22%, insufficient to exert a softening effect on the cellulose ester, adding thereto an alkaline compound selected from the group consisting of alkali metal, ammonium and aliphatic amine bases in an amount only sufficient to react with the carboxyl groups of the ester and separating the cellulose acetate phthalate salt thus obtained from the liquid portion of the mass.

3. A method of preparing the salt of an ester selected from the cellulose phthalates, succinates and maleates, both simple and mixed, which comprises dispersing the acid form of the ester in an aliphatic monohydroxy alcohol of 2–4 carbon atoms containing an amount of water, within the range of 3–22%, insufficient to exert a softening effect on the ester, adding thereto an alkaline compound selected from the group consisting of alkali metal, ammonium and aliphatic amine bases in an amount only sufficient to react with the carboxyl groups of the ester and separating the cellulose ester salt thus obtained from the liquid portion of the mass.

4. A method of preparing the salt of an ester selected from the group consisting of polyvinyl phthalates, succinates and maleates, both simple and mixed, which comprises dispersing the acid form of the ester in an aliphatic monohydroxy alcohol of 2–4 carbon atoms containing an amount of water, within the range of 3–22%, insufficient to exert a softening effect on the ester, adding thereto an alkaline compound selected from the group consisting of alkali metal, ammonium and aliphatic amine bases in an amount only sufficient to react with the carboxyl groups of the ester and separating the cellulose ester salt thus obtained from the liquid portion of the mass.

5. A method of preparing the salt of an ester selected from the group consisting of the cellulose and polyvinyl phthalates, succinates and maleates, both simple and mixed esters, which comprises dispersing the acid form of the ester in isopropanol containing an amount of water, within the range of 3–22%, insufficient to exert a softening effect on the ester, adding thereto an alkaline compound selected from the group consisting of alkali metal, ammonium and aliphatic amine bases in an amount only sufficient to react with the carboxyl groups of the ester and separating the solid product thus obtained from the liquid portion of the mass.

6. A method of preparing the salt of a cellulose acetate phthalate which comprises dispersing the acid form of the cellulose acetate phthalate in isopropanol containing an amount of water, within the range of 3–22%, insufficient to exert a softening effect on the ester, adding thereto an alkaline compound selected from the group consisting of alkali metal, ammonium and aliphatic amine bases in an amount only sufficient to react with the carboxyl groups of the ester and separating the solid cellulose acetate phthalate salt thus obtained from the liquid portion of the mass.

7. A method of preparing the salt of a polyvinyl phthalate which comprises dispersing the acid form of the polyvinyl phthalate in isopropanol containing an amount, within the range of 3–22%, insufficient to exert a softening effect on the ester, adding thereto an alkaline compound selected from the group consisting of alkali metal, ammonium and aliphatic amine bases in an amount only sufficient to react with the carboxyl groups of the ester and separating the solid polyvinyl phthalate salt from the liquid portion of the mass.

8. A method of preparing the salt of an ester selected from the group consisting of the cellulose acetate phthalates, succinates and maleates, which comprises dispersing the acid form of the ester in an aliphatic monohydroxy alcohol of 2–4 carbon atoms containing an amount of water, within the range of 3–22%, insufficient to exert a softening effect on the ester, adding thereto diethyl amine in an amount only sufficient to react with the carboxyl groups of the ester and separating the solid product thus obtained from the liquid portion of the mass.

9. A method of preparing the salt of an ester selected from the group consisting of the cellulose acetate phthalates, succinates and maleates, which comprises dispersing the acid form of the ester in an aliphatic monohydroxy alcohol of 2–4 carbon atoms containing an amount of water, within the range of 3–22%, insufficient to exert a softening effect on the ester, adding thereto aqueous ammonia in an amount only sufficient to react with the carboxyl groups of the ester and separating the solid product thus obtained from the liquid portion of the mass.

10. A method of preparing the salt of an ester selected from the group consisting of the cellulose acetate phthalates, succinates and maleates, which comprises dispersing the acid form of the ester in an aliphatic monohydroxy alcohol of 2–4 carbon atoms containing an amount of water, within the range of 3–22%, insufficient to exert a softening effect on the ester, adding thereto sodium hydroxide in an amount only sufficient to react with the carboxyl groups of the ester and separating the solid product thus obtained from the liquid portion of the mass.

References Cited in the file of this patent

UNITED STATES PATENTS

| | | |
|---|---|---|
| 2,093,463 | Malm et al. | Sept. 21, 1937 |
| 2,599,620 | Filbert | June 10, 1952 |
| 2,609,368 | Gaver | Sept. 2, 1952 |

FOREIGN PATENTS

| | | |
|---|---|---|
| 717,275 | Germany | Feb. 11, 1942 |